United States Patent
Rao et al.

(10) Patent No.: US 9,733,340 B2
(45) Date of Patent: Aug. 15, 2017

(54) TECHNIQUES FOR HIGH ARRIVAL ANGLE RESOLUTION USING MULTIPLE NANO-RADARS

(71) Applicant: Texas Instruments Incorporated, Dallas, TX (US)

(72) Inventors: Sandeep Rao, Bangalore (IN); Karthik Ramasubramanian, Bangalore (IN); Brian Ginsburg, Allen, TX (US); Jawaharlal Tangudu, Bangalore (IN); Karthik Subburaj, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 328 days.

(21) Appl. No.: 14/550,774

(22) Filed: Nov. 21, 2014

(65) Prior Publication Data

US 2016/0146931 A1    May 26, 2016

(51) Int. Cl.
*G01S 13/34* (2006.01)
*G01S 7/03* (2006.01)
*G01S 13/93* (2006.01)
*H01Q 1/32* (2006.01)

(52) U.S. Cl.
CPC .......... *G01S 7/032* (2013.01); *G01S 13/343* (2013.01); *G01S 13/931* (2013.01); *H01Q 1/3233* (2013.01)

(58) Field of Classification Search
CPC ...... G01S 7/032; G01S 13/931; G01S 13/343; H01Q 1/3233
USPC ............ 342/59, 195, 175, 109, 42, 51, 100, 342/70–72
See application file for complete search history.

(56) References Cited

U.S. PATENT DOCUMENTS

| | | | |
|---|---|---|---|
| 8,692,707 B2* | 4/2014 | Lee | G01S 7/4026 342/141 |
| 2012/0261579 A1* | 10/2012 | Ramaswamy | H01Q 3/26 250/340 |
| 2013/0214961 A1* | 8/2013 | Lee | G01S 3/74 342/27 |
| 2014/0022116 A1* | 1/2014 | Lee | G01S 3/74 342/175 |
| 2015/0276918 A1* | 10/2015 | Ramasubramanian | G01S 7/35 342/107 |
| 2016/0146931 A1* | 5/2016 | Rao | H01Q 1/3233 342/59 |
| 2017/0090014 A1* | 3/2017 | Subburaj | G01S 7/4004 |
| 2017/0090015 A1* | 3/2017 | Breen | G01S 7/4004 |

\* cited by examiner

*Primary Examiner* — John B Sotomayor
(74) *Attorney, Agent, or Firm* — Lawrence J. Bassuk; Charles A. Brill; Frank D. Cimino

(57) ABSTRACT

A device includes a circuit board having thereon, a controlling component, a first radar chip and a second radar chip. The first radar chip includes a first radar transmission antenna, a second radar transmission antenna and a first radar receiver antenna array. The second radar chip includes a second radar receiver antenna array. The controlling component can control the first radar chip and the second radar chip. The first radar transmission antenna can transmit a first radar transmission signal. The second radar transmission antenna can transmit a second radar transmission signal. The second radar chip is spaced from the first radar chip so as to create a virtual receiver antenna array between the first radar receiver antenna array and the second radar receiver antenna array.

20 Claims, 9 Drawing Sheets

TECHNIQUES FOR HIGH ARRIVAL ANGLE RESOLUTION USING MULTIPLE NANO-RADARS

BACKGROUND

The present invention relates generally to radar systems intended for a variety of applications including automotive and industrial applications.

A radar apparatus transmits a radar signal, which is reflected from multiple obstacles to create a received signal. The radar apparatus uses the received signal to estimate the distance, the velocity and the angle of arrival of these obstacles.

Continuous-Wave (CW) radars transmit either an unmodulated or modulated frequency carrier as the radar signal. A simple unmodulated signal can only detect the velocity and not range of a single object, and hence is not useful in applications where both range and relative velocity of multiple objects need to be simultaneously determined. In order to measure range, modulation of the radar signal is essential.

Frequency chirp architecture is the most popular of the automotive CW radars. In frequency-chirped radars, the frequency of the radar signal is varied according to a pre-determined pattern. The most widely used patterns are (a) frequency-stepped, in which frequency is changed by a step in each time period and (b) Linear Frequency Modulation (LFMCW), often referred to simply as FMCW, in which transmit frequency is changed continuously within each time period. This varying frequency essentially widens the bandwidth of the radar signal, which is equivalent to narrowing the signal in the time-domain. An FMCW radar can simultaneously estimate both the velocity and range of multiple objects.

For ease of explanation, some aspects of the prior art and the invention are discussed with respect to a radar apparatus which uses a frequency modulated continuous wave (FMCW) signal.

FIG. 1 shows diagram 100, which illustrates a conventional automotive object detection application.

As shown in the figure, diagram 100 includes a car 102, a radar transceiver 103, a radar beam 104, an object 106, an object 108, an object 110, a reflected wave 112, a reflected wave 114 and a reflected wave 116.

Object 106, object 108 and object 110 are arranged to be within the coverage range of radar beam 104 and are additionally arranged to have different distances from car 102, different bearings to car 102, and different velocities. Radar transceiver 103 is operable to transmit radar beam 104, to receive reflections from objects within the beam and to determine distance, velocity and arrival angle. Object 106 produces reflected wave 112, object 108 produces reflected wave 114 and object 110 produces reflected wave 116.

Radar beam 104 comprises a continuous series of transmitted frequency modulated "chirps", each chirp being a short period of radar carrier transmission ramping in frequency from, for example, 77 GHz to 81 GHz. For any transmitted chirp, reflected wave 112, reflected wave 114 and reflected wave 116 each will arrive back at radar transceiver 103 at a different time, with a different Doppler and at a different arrival angle.

An object's distance, velocity, and angle within the beam can be ascertained by analyzing the properties of their reflected waves. For chirped radar, both the velocity and distance of an object from radar transceiver 103 can be ascertained by analyzing the spectrum of the received signals. Since transceiver 103 has a plurality of receive antennas in the form of an antenna array, the angle of arrival of the reflected waves can be ascertained by analyzing the reflected wave reception across the antennas comprising the array.

FIG. 2 shows a conventional FMCW type of radar system 200 with one transmit and one receive antenna.

As shown in the figure, system 200 includes ramp generating component 202, transmit antenna 204, a local oscillator 208, a receive antenna 212, a mixer 216, an analog to digital converter (ADC) 220 and a digital signal processor (DSP) 224.

Ramp generating component 202 is arranged to receive signals from local oscillator 208 on line 210 and to connect to transmit antenna 204, via line 206. Mixer 216 is arranged to receive signals from receive antenna 212 on line 214, to receive signals from ramp generating component 202 on line 206 and to send signals to ADC 220. DSP 224 receives signals from ADC 220 via line 222.

Local oscillator 208 is operable to provide reference signals (such as timing and/or reference frequencies) to ramp generating component 202. Ramp generating component 202 is operable to generate frequency ramp signals and transmit antenna 204 is operable to transmit those signals over the air. In some embodiments, the local oscillator itself may provide a frequency ramp centered around a lower frequency which may then be translated to the frequency of transmission by a ramp generator. Receive antenna 212 is operable to receive signals over the air. Mixer 216 is operable to apply a frequency mixing function. ADC 220 is operable to convert analog signals to digital signals and DSP 224 to process the digital signals.

A chirped CW signal is generated at ramp generating component 202 based on the input from local oscillator 208, and is transmitted over the air by transmit antenna 204. The transmitted chirped signal reflects from objects within the range and coverage of the radar beam and the reflected signals are received at antenna 212 and then are passed to mixer 216. Mixer 216 mixes the received signal with the transmitted frequency ramp to produce an analog intermediate frequency (IF) signal on line 218. The analog IF signal is sampled by ADC 220 to produce a digital IF signal on line 222. The digital IF signal is then processed and analyzed by DSP 224 to determine velocity and range of objects within the beam.

System 200 contains only one receive antenna, and as such, is not disposed to resolve the angle of arrival of reflected signals from objects and thus their locations. The resolution of angles of arrival is achieved through the use of a receive antenna array. The more antennas that comprise the array, i.e., the longer the array, the higher the resolution possible. Gesture recognition and some automotive applications, in particular, can require high resolution measurements of arrival angle.

FIG. 3 shows a prior art radar system 300 implementing a receive antenna array by using a plurality of identical integrated circuits or "chips" to support a plurality of receive antennas.

As shown in the figure, system 300 includes a radar chip 302, a radar chip 304, and a receiver antenna array 306. Receiver antenna array 306 includes a line 308, a line 310, a line 312, a line 314, a line 316 and a line 318.

Antenna array 306 is arranged to contain six antennas and is operable to receive reflected radar signals over the air. Line 308, line 310 and line 312, line 314, line 316 and line 318 are arranged to connect the antennas of antenna array 306 to radar chip 302 and radar chip 304.

Radar chip 302 and radar chip 304 are operable to provide both transmit and receive radar functions. Since this discussion involves only receive functions, transmit functions will not be covered for this figure. Radar chip 302 and radar chip 304 are further operable to provide functions for a plurality of external receive antennas. Each of radar chip 302 and radar chip 304 can support receive functions for up to three antennas.

Line 308, line 310 and line 312, line 314, line 316 and line 318 operate at RF frequencies in the region of 77 GHz. External lines and connectors design to support signals at such high frequencies are very specialized, very lossy and very costly, as is circuit board routing of such signals.

It is advantageous, therefore, in a radar apparatus to have the antennas integrated onto the package. This allows for a very integrated and cost effective solution. However, limitations on the number of channels on a single chip and the package size can limit the number of antennas that can be integrated in this way. In addition, the limited number of antennas can in turn limit the angle resolution achievable with such a radar apparatus. Techniques by which multiple radar chips with integrated antennas can be tiled together to improve the angle resolution are thus desirable.

FIG. 4 shows a prior art radar system 400 employing a plurality of radar chips with integrated antennas and chip tiling.

As shown in the figure, system 400 includes a radar chip 402, a radar chip 404 and an arrowed line 405. Radar chip 402 further includes transmit antenna 406, receive antenna 408 and receive antenna 410. Radar chip 404 further includes receive antenna 412 and receive antenna 414.

Radar chip 402 and radar chip 404 are arranged as a tiled pair and are as close as physically possible. Transmit antenna 406 is arranged as shown in the figure at the bottom of radar chip 402. Receive antenna 408 and receive antenna 410 are arranged as shown in the figure at the top of radar chip 402.

Additionally, the distance between receive antenna 408 and receive antenna 410 represents the distance required for antenna array formation at the frequency of operation. This is typically half the wavelength of operation. Receive antenna 412 and receive antenna 414 are arranged as shown in the figure at the top of radar chip 404. Again, the distance between receive antenna 412 and receive antenna 414 represents the distance required for antenna array formation at the frequency of operation. Arrowed line 405 is arranged between receive antenna 410 and receive antenna 412.

Radar chip 402 is operable to provide radar transmit and receive functions. Radar chip 404 is operable to provide radar receive functions. Radar chip 404 is also operable to provide transmit functions but these are unused. Receive antennas 408, 410, 412 and 414 are all operable to receive radar signals over the air.

System 400 is an attempt to tile two radar chips together to form a receive antenna array with four antennas. However, even though radar chip 402 and radar chip 404 are tiled together as closely as possible, the distance D as indicated by arrowed line 405 is much too large for the antennas to form a usable array across all four antennas, and this arrangement would not work. While in some cases it may be possible to change the dimensions of the chips or the position of the antennas on the chips, this would lead to constant customization of chips to specific applications.

It has already been explained that in attempting to employ multiple radar chips to form the long receive antenna arrays required for the high arrival angle resolutions needed by common applications, the use of external antennas is a difficult and very costly approach.

It has also been explained how solutions which use multiple radar chips with integrated antennas are severely limited by necessary restrictions on chip size, antenna spacing and chip spacing.

It should be noted that due to differing signal path lengths, component variability, differing temperatures, etc., between radar chips in a tiled configuration, calibration and synchronization techniques would have to be applied in order for the chips to work in conjunction with each other.

What is needed are systems and methods for implementing long receive antenna arrays employing the tiling of a plurality of standard radar chips that can overcome the geometric problems conventionally encountered, thus avoiding the extensive radar chip customization otherwise necessary and eliminating the many disadvantages of conventional, costly external antenna arrangements.

BRIEF SUMMARY

The present invention provides novel systems and methods for implementing long receive antenna arrays employing the tiling together of a plurality of standard radar chips the systems and methods overcoming the geometric problems conventionally encountered, thus avoiding the extensive radar chip customization otherwise necessary and eliminating the many disadvantages of conventional, costly external antenna arrangements.

The present invention is drawn to device includes a circuit board having thereon, a controlling component, a first radar chip and a second radar chip. The first radar chip includes a first radar transmission antenna, a second radar transmission antenna and a first radar receiver antenna array. The second radar chip includes a second radar receiver antenna array. The controlling component can control the first radar chip and the second radar chip. The first radar transmission antenna can transmit a first radar transmission signal. The second radar transmission antenna can transmit a second radar transmission signal. The second radar chip is spaced from the first radar chip so as to create a virtual receiver antenna array between the first radar receiver antenna array and the second radar receiver antenna array.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

DETAILED DESCRIPTION

Aspects of the present invention are drawn to a technique known as "Sparse Antennas," used in the context of tiling a plurality of standard radar chips to form long receive antenna arrays.

One aspect of the present invention is drawn to the use of one or more standard radar chips containing two or more embedded receive antennas together with one or more standard radar chips containing two or more embedded receive antennas as well as two or more embedded transmit antennas, all chips being arranged in a tiled configuration. The configuration operates together with an implementation of the sparse antenna technique to fill large gaps between "real" embedded receive antennas with "virtual" antennas. This produces a receive antenna array consisting of a number of both real and virtual antennas but which is mathematically equivalent to an array of the same number of real antennas.

Other aspects of the present invention are drawn to additional systems and methods designed to calibrate and synchronize, in phase and frequency, a plurality of standard radar chips in order for them to function correctly in conjunction with each other.

Other aspects of the present invention are drawn to the design of radar chip layouts and orientations which allows the chips to form long antenna arrays of real antennas.

The aspects listed above together represent unique and novel systems and methods which permit significantly increased flexibility in the application of standard radar chips to form long antenna arrays. Many of the disadvantages of external antennas and the restrictions on chip size, antenna spacing and chip spacing inherent in conventional techniques are overcome, and significant reductions in hardware resources are also attained.

A sparse antenna array uses conventional techniques to reduce the number of physical antennas required in a receive antenna array without sacrificing performance. The physical antenna reduction is achieved by forming synthesized array elements or "virtual antennas" through the use of additional transmit antennas and digital signal processing.

Aspects of the present invention will now be described in greater detail with reference to FIGS. 5-16.

Figure 1:
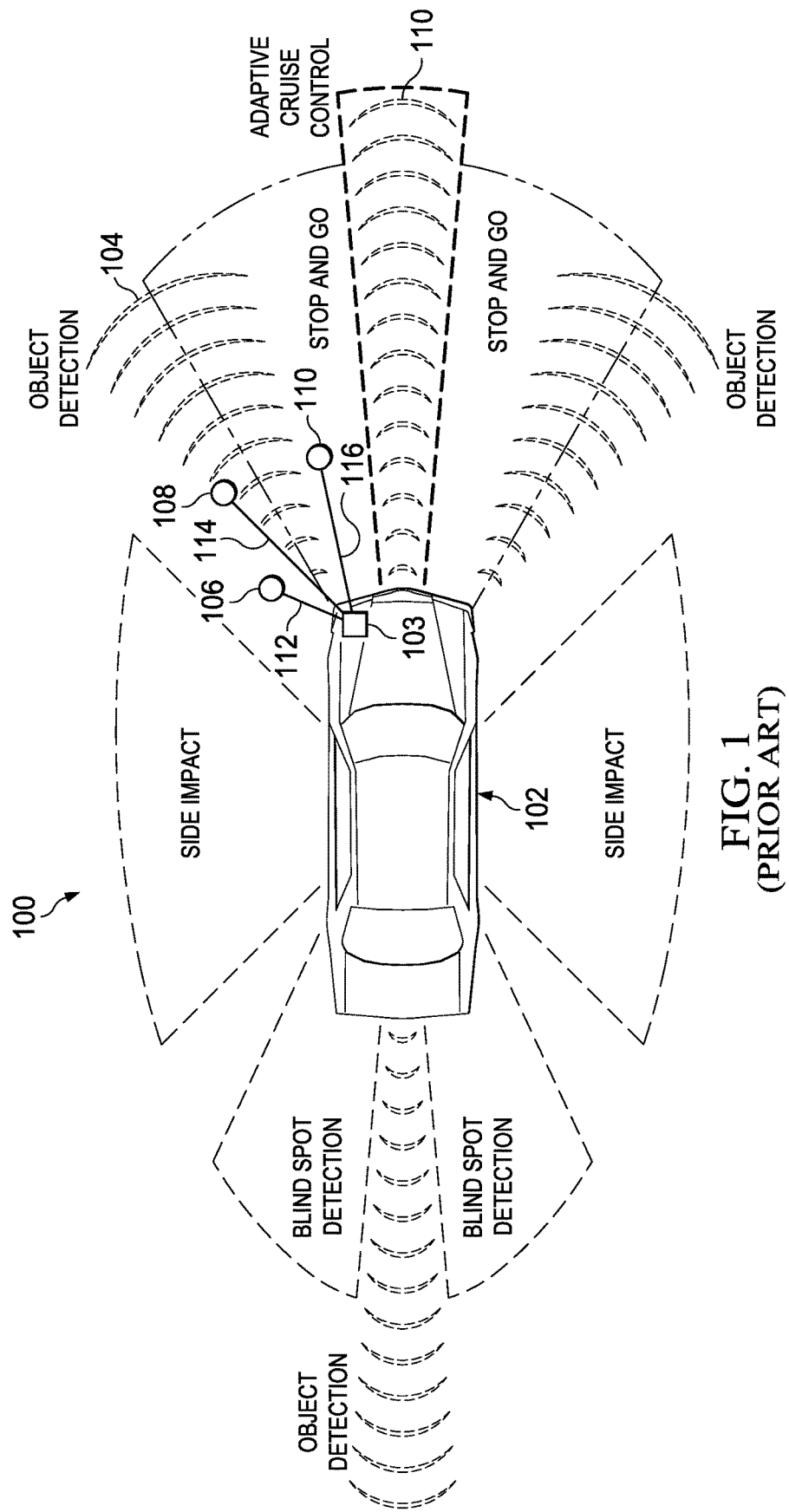
FIG. 1 illustrates an automotive object detection application.
Figure 2:
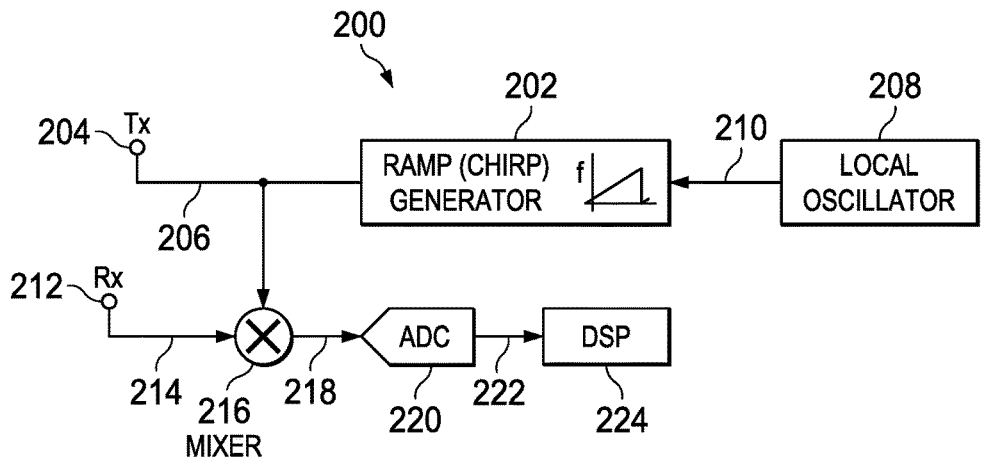
FIG. 2 shows, a simplified FMCW type of radar system with one transmit and one receive antenna.
Figure 3:
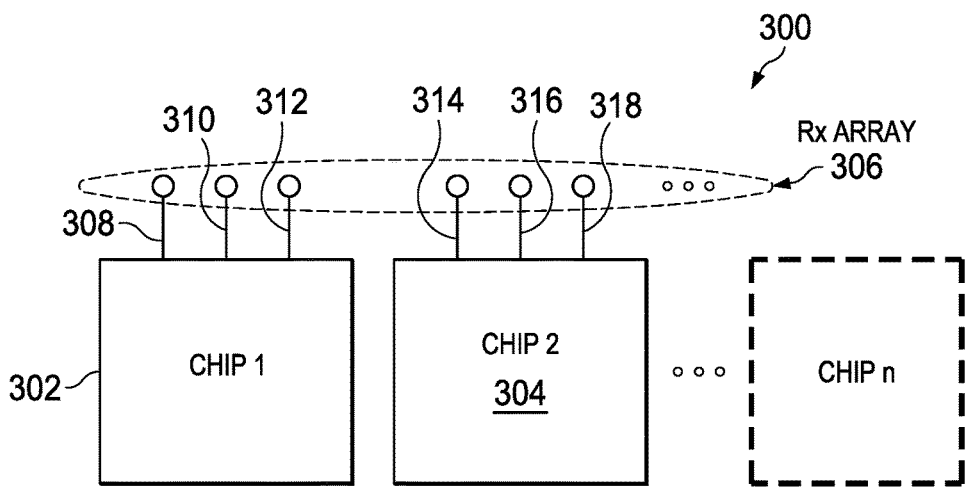
FIG. 3 shows a radar system implementing a receive antenna array by using a plurality of identical integrated circuits or "chips" to support a plurality of receive antennas.
Figure 4:
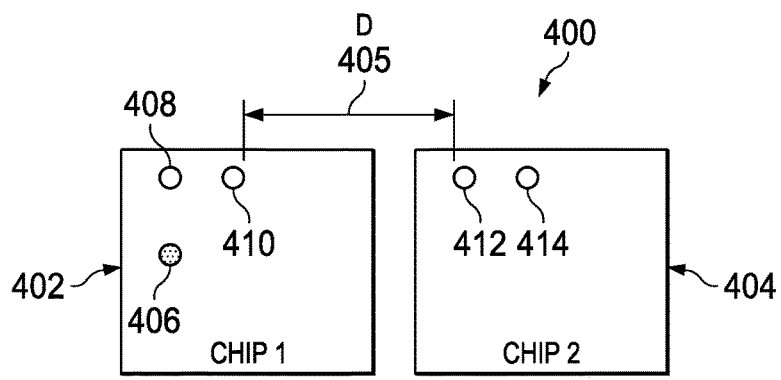
FIG. 4 shows a radar system employing a plurality of radar chips with integrated antennas and chip tiling.
Figure 5:
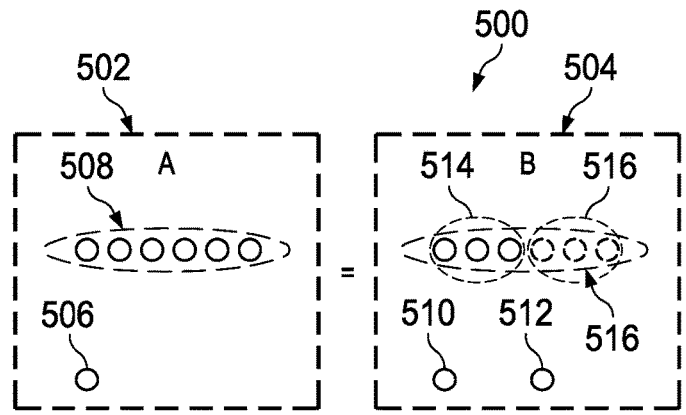
FIG. 5 shows a diagram which compares a real antenna array implementation with an equivalent sparse antenna array implementation.

FIG. 5 shows diagram 500, which compares a real antenna array implementation with an equivalent sparse antenna array implementation.

As shown in the figure, diagram 500 includes an antenna array 502 and an antenna array 504. Antenna array 502 includes a transmit antenna 506 and a receive antenna array 508. Antenna array 504 includes a transmit antenna 510, a transmit antenna 512, a receive antenna array 514 and a virtual receive antenna array 516.

Transmit antenna 506, transmit antenna 510 and transmit antenna 512 are all operable to transmit radar signals over the air. Receive antenna array 508 and receive antenna array 514 are both operable to receive radar signals over the air.

Antenna array 502 represents configuration A, a typical antenna array using real antennas. Configuration A has one transmit antenna (506) with six physical or "real" receive antennas (508).

Antenna array 504 represents configuration B, a sparse antenna array. Configuration B has a transmit antenna (510) with three physical receive antennas (514). Configuration B also has an additional transmit antenna (512). Receive antenna array 514 will receive signals that are radar reflections originating from signals transmitted from both transmit antenna 510 and transmit antenna 512. To ensure that the transmissions from transmit antenna 510 and transmit antenna 512 do not interfere with each other techniques such as time division multiplexing, frequency division multiplexing or PN code modulation may be used. By applying digital signal processing on these received signals, three virtual antennas can be synthesized as represented by virtual receive antenna array 516. The signal on the three virtual antennas is derived from the signal received by the receive antenna array 514 due to transmissions from transmit antenna 512. The signal processing is implemented such that antenna configuration B is the mathematical equivalent of configuration A. However configuration B uses only five physical antennas whereas configuration A uses seven physical antennas, a savings of two physical antennas.

As previously stated, a major aspect of the present invention is to apply sparse antenna techniques to the formation of long receive antenna arrays through the tiling of radar chips in order to eliminate the potential large antenna separation gaps between chips.

Figure 6:
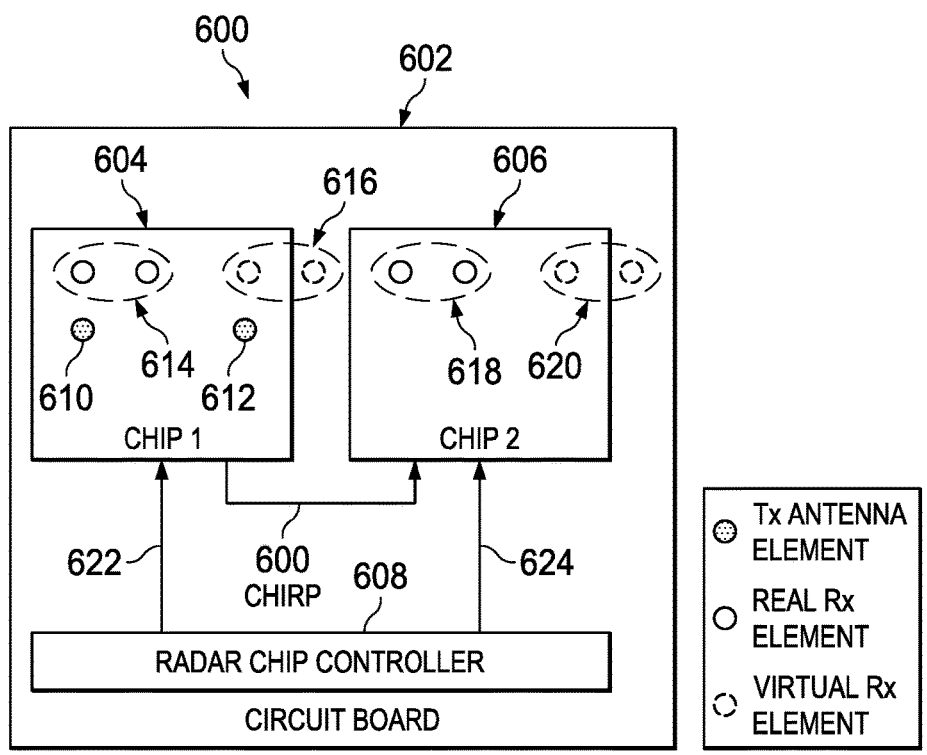
FIG. 6 shows a radar system implemented by combining radar chip tiling and sparse antenna techniques in accordance with aspects of the present invention.

FIG. 6 shows system 600, a radar system implemented by combining radar chip tiling and sparse antenna techniques in accordance with aspects of the present invention.

As shown in the figure, system 600 includes a circuit board 602, a radar chip 604, a radar chip 606 and a chip controller 608. Radar chip 604 includes a transmit antenna 610, a transmit antenna 612, a receive antenna array 614 and a virtual antenna receive array 616. Radar chip 606 includes a receive antenna array 618 and a virtual receive antenna array 620.

Radar chip 604 and radar chip 606 are physically arranged to be as close as possible to each other while ensuring that the arrays 614, 616, 618 and 620 together form a uniformly spaced linear array. Chip controller 608 is arranged to connect to radar chip 604 via line 622 and to connect to radar chip 606 via line 624. Alternatively, intermediate circuitry may be included to modify signals prior to radar chip 604. Non-limiting examples of intermediate circuitry include amplifiers, filters, resistors, and digital devices including pulse shapers, analog-to-digital converters and digital-to-analog converters, etc. Similarly, intermediate circuitry may be included to modify signals prior to radar chip 606.

Circuit board 602 is operable to supply connections and power to devices mounted on it. Radar chip 604 is operable to provide transmission of radar signals, reception of radar signals and signal processing of received radar signals. Radar chip 606 is operable to provide reception of radar signals and signal processing of received radar signals. Transmit antenna 610 and transmit antenna 612 are each operable to transmit signals over the air. Receive antenna array 614 and receive antenna array 618 are each operable to receive signals from over the air. Antenna array 614 is asymmetrically disposed on radar chip 604 such that antenna array 614 is closer to one side of radar chip 604 than the other side of radar chip 604. Similarly, antenna array 618 is asymmetrically disposed on radar chip 606 such that antenna array 618 is closer to one side of radar chip 608 than the other side of radar chip 608. Chip controller 608 is operable to control radar chip 604 and radar chip 606 and also provides processing functions where received signals from both chips are part of the process.

In operation, radar chip 604, transmits radar chirps on two antennas and receives radar return signals via receive antenna array 614, which, in this embodiment, is an antenna array using two physical antennas embedded on the chip (such as, for example, on the package of the chip). To ensure that the transmissions from the two transmit antennas 610 and 612 do not interfere with each other techniques such as time division multiplexing, frequency division multiplexing or PN coded modulation may be used. Radar chip 606, provides an additional receive antenna array of two physical antennas, i.e. receive antenna array 618. It should be noted however, that the physical receive antennas alone would form a four antenna array with an unacceptably large gap between the antennas of each chip.

Signal processing is applied to the received signals from the two real receive antennas of radar chip 604. As described for FIG. 5, since these signals represent radar returns from two transmit antennas, two additional virtual antennas can be synthesized as illustrated by virtual antenna receive array 616. Similarly, signal processing is applied to the received signals from the two real receive antennas of radar chip 606 allowing virtual receive antenna array 620 to be synthesized.

Thus, through the use of more than one transmit antenna and sparse antenna digital signal processing, and in accordance with aspects of the present invention, the receive antenna array gaps between the tiled chips have been filled in with virtual antennas. Furthermore, a receive antenna array with a length of eight has been implemented using only four physical receive antennas and an additional transmit antenna. It is not intended to be limiting for this embodiment to use radar chips with two physical receive antennas. In other embodiments, aspects of the present invention are applied to longer physical receive array lengths.

For this embodiment, one radar chip has transmit antennas, the other does not. In other embodiments, and where it is advantageous for all radar chips to be exactly the same or "standard", all radar chips may have transmit antennas but in operation not all transmit antennas may be used. Furthermore, in some embodiments, transmit antennas on multiple radar chips can be operated in order to create arrays of longer length as discussed later.

Since there can be differing signal path lengths, component variability, differing temperatures, etc., between radar chips in a multi-chip tiled configuration, calibration and synchronization techniques may have to be applied in order for the chips to work in conjunction with each other. One novel system and method for achieving this, in accordance with the present invention, can be to implement overlapping real and virtual antennas, i.e., having a real antenna collocated with a virtual antenna.

Figure 7:
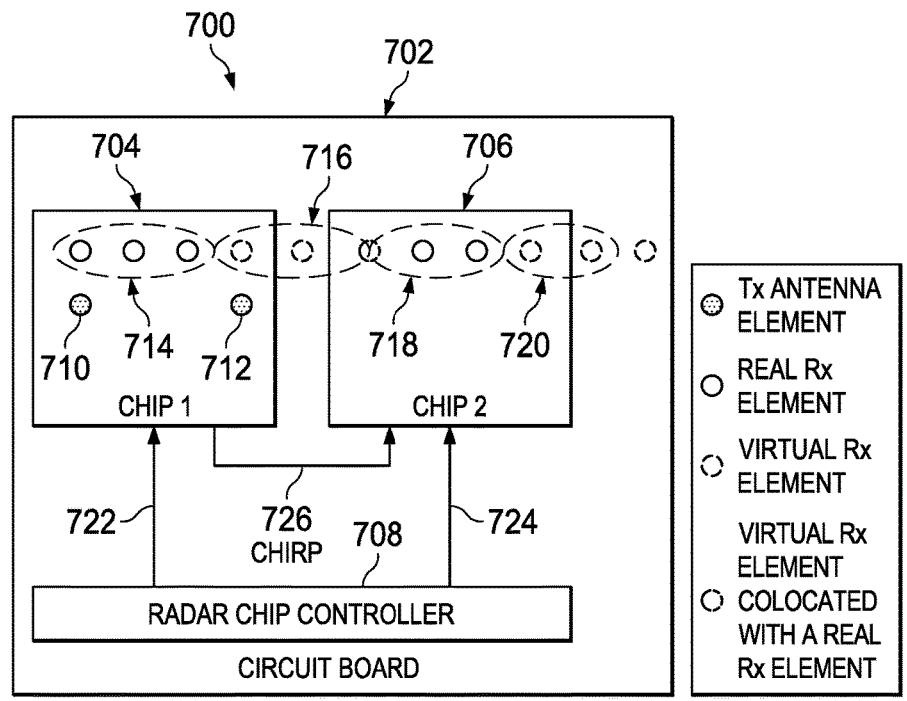
FIG. 7 shows a radar system employing overlapped antennas for calibration in accordance with aspects of the present invention.

FIG. 7 shows system 700, a radar system employing overlapped antennas for calibration.

As shown in the figure, system 700 includes a circuit board 702, a radar chip 704, a radar chip 706 and a chip controller 708. Radar chip 704 includes a transmit antenna 710, a transmit antenna 712, a receive antenna array 714 and a virtual antenna receive array 716. Radar chip 706 includes a receive antenna array 718 and a virtual receive antenna array 720.

Radar chip 704 and radar chip 706 are physically arranged such that one antenna of virtual antenna receive array 716 is collocated with one antenna of receive antenna array 718. Chip controller 708 is arranged to connect to radar chip 704 via line 722 and to connect to radar chip 706 via line 724. Radar chip 704 is arranged to connect to radar chip 706, via line 726. It should be noted that, intermediate circuitry may be included to modify signals along lines 722, 724 and/or 726.

Circuit board 702 is operable to supply connections and power to devices mounted on it. Radar chip 704 is operable to provide transmission of radar signals, reception of radar signals, signal processing of received radar signals and reference timing. Radar chip 706 is operable to provide reception of radar signals and signal processing of received radar signals. Chip controller 708 is operable to provide control signals and additional processing functions.

In operation, radar chip 704 transmits radar chirps on two antennas, transmit antenna 710 and transmit antenna 712, and receives radar return signals via receive antenna array 714 which, in this embodiment, is an antenna array using three physical antennas embedded on radar chip 704. Radar chip 706 provides an additional receive antenna array of three physical antennas, i.e. receive antenna array 718.

Signal processing is applied to the received signals from the three real receive antennas of radar chip 704. Since these signals represent radar returns from two transmit antennas, three additional virtual antennas can be synthesized as illustrated by virtual antenna receive array 716. Similarly, signal processing is applied to the received signals from the three real receive antennas of radar chip 706 allowing virtual receive antenna array 720 to be synthesized.

As shown in the figure, radar chip 704 sends its local oscillator frequency, $F_{LO}$, via line 726 to radar chip 706 to synchronize the operation of the two radar chips.

However, signals between radar chip 704 and radar chip 706 may be out of phase due to the different path lengths for $F_{LO}$ to reach the mixer of each of the radar chips 704 and 706. In this embodiment, the last antenna of virtual antenna receive array 716 overlaps the first antenna of receive antenna array 718 and so the receive signals present at this location represent different versions of the same receive signal, the former having the timing of radar chip 706 and the latter having the timing of radar chip 704. Any phase difference seen between the two versions of the received signals, therefore, is a direct indication of the synchronization delay between chips, and the delay values can be used as a calibration factor for the system. Thus, an important and novel aspect of the present invention, the collocation of real and virtual signals, can be used to calibrate phases in order to maintain the synchronization between chips.

Other embodiments can have more than one overlapping antenna position and the additional antennas positions can be used for more extensive calibration procedures. An embodiment with three overlapping antenna positions is described below.

Figure 8:
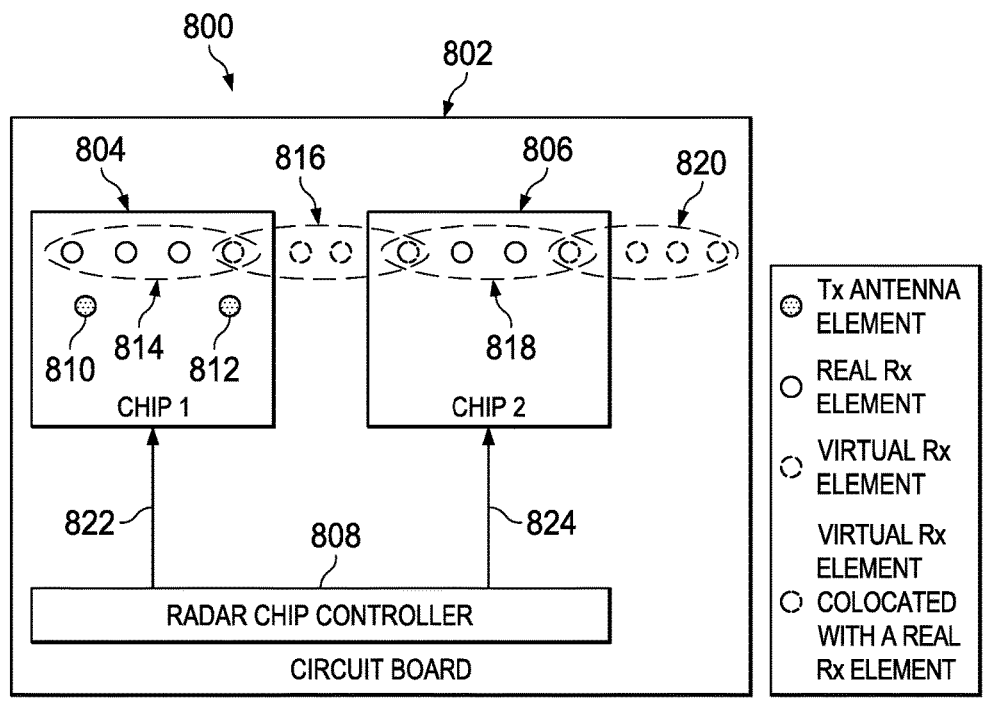
FIG. 8 shows a radar system employing three position overlapped antennas for calibration in accordance with aspects of the present invention.

FIG. 8 shows system 800, a radar system employing three position overlapped antennas for calibration.

As shown in the figure, system 800 includes a circuit board 802, a radar chip 804, a radar chip 806 and a chip controller 808. Radar chip 804 includes a transmit antenna 810, a transmit antenna 812, a receive antenna array 814 and a virtual antenna receive array 816. Radar chip 806 includes a receive antenna array 818 and a virtual receive antenna array 820.

Transmit antennas 810 and 812 in radar chip 804 are physically arranged such that one antenna of virtual antenna receive array 816 overlaps with one antenna of receive antenna array 814; and one antenna of virtual antenna receive array 820 overlaps with one antenna of receive antenna array 818. Radar chip 804 and radar chip 806 are further physically arranged such that one antenna of virtual antenna receive array 816 overlaps with one antenna of receive antenna array 818. Chip controller 808 is arranged to connect to radar chip 804 via line 822 and to connect to radar chip 806 via line 824. It should be noted that, intermediate circuitry may be included to modify signals along lines 822 and/or 824.

Circuit board 802 is operable to supply connections and power to all devices mounted on it. Radar chip 804 is operable to provide transmission of radar signals, reception of radar signals, signal processing of received radar signals and reference timing. Radar chip 806 is operable to provide reception of radar signals and signal processing of received radar signals. Chip controller 808 is operable to provide control signals and additional processing functions.

In operation, radar chip 804 transmits radar chirps on two antennas and receives radar return signals via receive antenna array 814, which, in this embodiment, is an antenna array using four physical antennas embedded on the chip. Radar chip 806 provides an additional receive antenna array of four physical antennas, i.e. receive antenna array 818.

Signal processing is applied to the received signals from the four real receive antennas of radar chip 804. Since these signals represent radar returns from two transmit antennas, four additional virtual antennas can be synthesized as illustrated by virtual antenna receive array 816. Similarly, signal processing is applied to the received signals from the four real receive antennas of radar chip 806 allowing virtual receive antenna array 820 to be synthesized. Transmit antenna 810, being arranged, in this embodiment, a certain distance, 1.5λ, from transmit antenna 812, where λ is the wavelength of the nominal transmit frequency, ensures the overlap between virtual receive array 816 and receive antenna array 814. It also ensures the overlap between virtual receive array 820 and receive antenna array 818. These overlaps are useful to calibrate intra chip delay differences that may exist between transmission from transmit antenna 810 and transmit antenna 812. The placement of the radar chip 806 is such that there is a distance of 1.5λ between the receive antenna arrays 814 and 818. This ensures the overlap between virtual receive array 816 and receive antenna array 818. This overlap is useful in calibrating inter-chip delays.

The three instances of overlapping elements can take care of the calibration of unknown phase offsets across both radar chip 804 and radar chip 806 during the transmissions on both transmit antennas. Thus the technique can be used to estimate for phase offsets of local oscillator signals across chips. It can also be used to estimate phase offsets of the local oscillator (LO) signal across transmissions from multiple transmitters both inter-chip and intra-chip. The phase offset that is estimated could be the residual phase offset after a previous calibration procedure. For example the previous calibration procedure might include a frequency correction to correct for larger delay mismatches.

The process of generating a chirp may involve programming the instantaneous frequency of the chirp ($F_n$). While this programming logic may operate at a high frequency (several GHz's), its clock (referred to herein as the frequency programming clock) is derived from a lower frequency source, i.e. a reference clock (typically of the order of few 10's of MHz). Additionally, the control logic which determines the start/stop of the chirp may also be derived from the reference clock.

One approach to synchronize multiple cascaded radar chips is for the all the chips to use the same LO. This can be done, for example by having one radar chip generate the LO, which is then routed to the other radar chips, for example, the line 600 of FIG. 6, can be used to route the LO from chip 604 to chip 606). While this approach has certain advantages, in that it ensures that the phase noise at each mixer is correlated, it also requires routing of the LO, which is order of GHz or greater, across the board thus increasing board costs. An alternate approach is to synchronize radar chips based on a common lower frequency reference clock source. In this approach each chip derives its own frequency programming timing and control timing using the common reference clock source. For example, each chip may generate its own LO signal and frequency programming clock using the common reference clock source.

Under these conditions, a misalignment in the frequency programming across multiple chips may still be possible. Such misalignment becomes more likely the higher the frequency of the frequency programming clock. For instance, when the LO of a particular radar chip is programming a frequency value of $F_n$, the LO of another radar chip could be programming a frequency value of $F_{n+1}$. This results in a frequency offset between the instantaneous chirp frequencies generated on multiple radar chips, and so the offset will exist between the radar chip that transmits the chirp and a radar chip that is receiving the chirp.

For a particular transmitting antenna, the receive antennas located on multiple chips will see different frequency offsets. Since the misalignment that causes the frequency offset will be an integral number of cycles of a higher frequency clock (such as the frequency programming clock) derived from the reference clock and internal to the chip, the frequency offset of the IF signal across multiple receiving radar chips will be integral multiples of $ST_c$ Hz, where S is the slope of the transmitted chirp in Hz/second and $T_c$ is the clock period of the higher frequency internal clock. So the tone in the IF signals corresponding to a specific obstacle's return will occur at different frequency offsets in different receiving radar chips. This can be illustrated with reference to FIG. 9 and FIG. 10.

Figure 9:
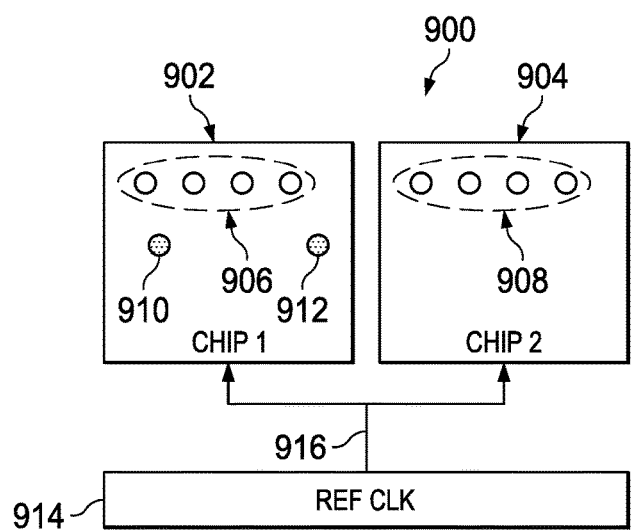
FIG. 9 shows a diagram illustrating two radar chips served by a single reference clock.

FIG. 9 shows diagram 900 illustrating two radar chips served by a single reference clock each radar chip using this reference clock to generate its own LO signal.

As shown in the figure, diagram 900 includes a radar chip 902, a radar chip 904, a reference clock generator 914, and a line 916. Radar chip 902 includes a receive antenna array 906, a transmit antenna 910 and a transmit antenna 912. Radar chip 904 includes a receive antenna array 908.

Reference clock generator 914 is arranged to connect to radar chip 902 and to radar chip 904 via line 916. It should be noted that, intermediate circuitry may be included to modify signals along line 916. Radar chip 902 is operable to provide transmission of radar signals, reception of radar signals and signal processing of received radar signals. Radar chip 904 is operable to provide reception of radar signals and signal processing of received radar signals. Transmit antenna 910 and transmit antenna 912 are operable to transmit radar chirps. Receive antenna arrays 906 and 908 are operable to receive return signals over the air. Reference clock generator 914 is operable to generate a clock signal.

In operation, radar chip 902 and radar chip 904 both receive radar returns based on reflection of the transmission from transmit antenna 910. Radar chip 902 and radar chip 904 receive a common reference clock as generated by reference clock generator 914. In this embodiment, radar chip 902 and radar chip 904 both derive their respective internal timing and higher frequency internal clocks (such as the frequency programming clock) from the common reference clock rather than any common LO signal that is routed from a "master" chip. Despite this, there can still be frequency offsets between internal higher frequency clocks of each of radar chip 902 and radar chip 904, as explained above.

The effect of the frequency offsets will now be discussed with reference to FIG. 10.

Figure 10:
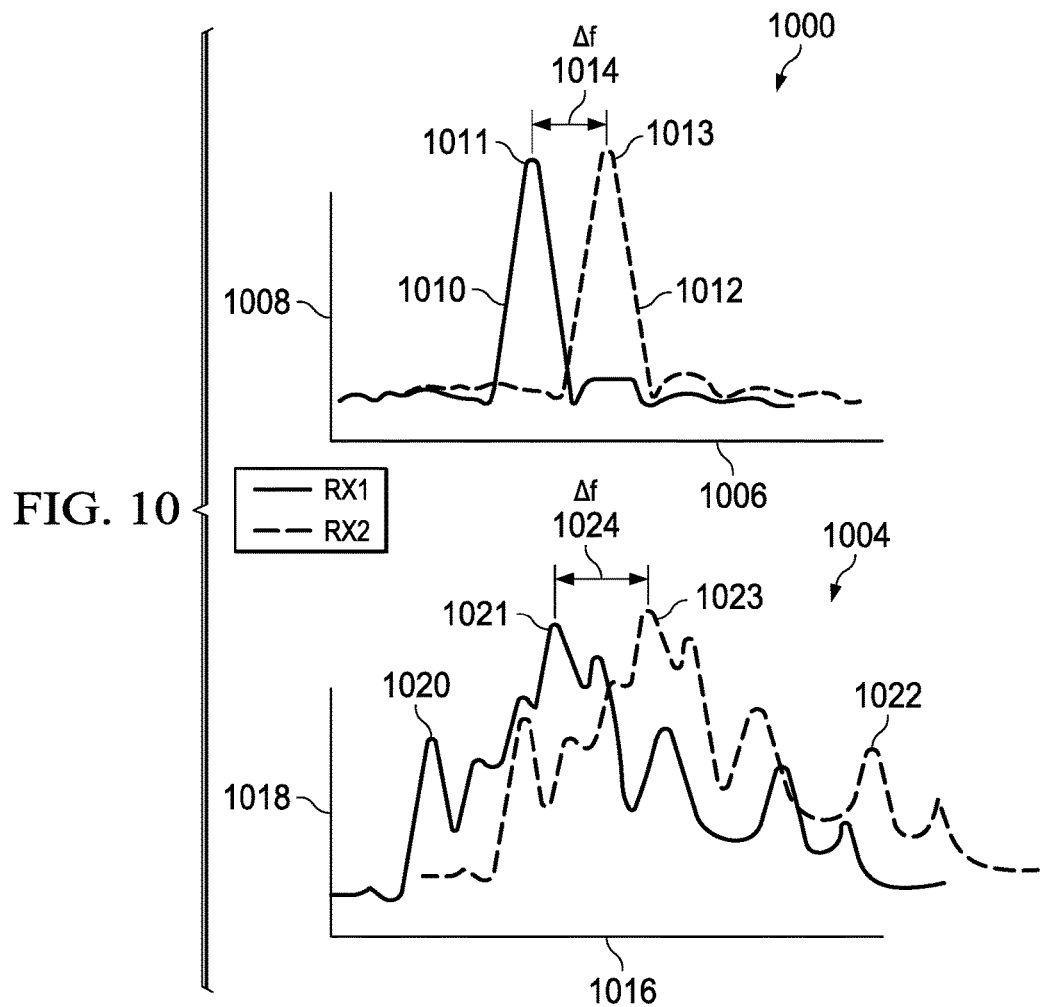
FIG. 10 illustrates IF signals viewed in the frequency domain to show the effect of frequency offsets on radar return tones.

FIG. 10 shows diagram 1000, illustrating IF signals viewed in the frequency domain to show the effect of frequency offsets on radar return tones.

As shown in the figure, diagram 1000 includes a graph 1002 and a graph 1004. Graph 1002 includes an x-axis 1006, a y axis 1008, a spectrum 1010, a spectrum 1012, a peak 1011, a peak 1013 and a distance line 1014. Graph 1004 includes an x-axis 1016, a y axis 1018, a spectrum 1020, a spectrum 1022 a peak 1021, a peak 1023 and a distance line 1024.

X-axis 1006 and x-axis 1016 represent frequency. Y-axis 1008 and y-axis 1018 represent amplitude. Spectrum 1010 is the frequency spectrum of the IF signal generated by radar chip 902 of FIG. 9 from signals received at receive antenna array 906 and is based on a radar return resulting from the transmission of a chirp via transmit antenna 910 and reflected from an object. Spectrum 1010 contains peak 1011. Spectrum 1012 is generated by radar chip 904 of FIG. 9 from signals received at receive antenna array 908 and is based on a radar returns from the same chirp and object. Spectrum 1012 contains peak 1013. Spectrum 1020 is the frequency spectrum of the IF signal generated by radar chip 902 of FIG. 9 from signals received at receive antenna array 906 and is based on object returns from the transmission of a chirp via transmit antenna 910. Spectrum 1020 contains peak 1021. Spectrum 1022 is the frequency spectrum generated by radar chip 904 of FIG. 9 from signals received at receive antenna array 908 and is based on obstacle returns from the chirp transmission via transmit antenna 910. Spectrum 1022 contains peak 1023.

Peak 1011 and peak 1013 represent a radar return from the same object, a single object located in the radar beam. Since there is a frequency offset between radar chip 902 and radar chip 904, the two peaks present at a different frequency. Distance line 1014 represents the IF frequency offset, $\Delta f$, between radar chip 902 and radar chip 904.

Graph 1004 represents the same conditions as in graph 1002, but with several objects in the radar beam instead of a single object. Spectrum 1020 and spectrum 1022, therefore have several peaks, each peak representing a return from a different object. For graph 1004, distance line 1024 represent the IF frequency offset, $\Delta f$, between radar chip 902 and radar chip 904.

The frequency offset in the IF signals described above needs to be corrected prior to estimating the angle of arrival of obstacles. Two methods of correcting for this frequency offset in accordance with aspects of the present invention are now described. Both methods involve comparing the frequency spectrum of the IF signal across the RX paths of multiple antennas of multiple radar chips.

In the first method (dominant peak method), a dominant peak in the frequency spectrum is identified across multiple radar chips. In graph 1002, this may be peak 1011. For example, in graph 1004, peak 1021 can be identified as the dominant peak. In addition, a reference frequency spectrum is established. For example, the spectrum of the IF signal corresponding to one of the receive antennas of the array may be the reference, and a frequency offset of this dominant peak with respect to this reference is estimated for each of the chips. The estimated frequency offset is then rounded off to the nearest multiple of $ST_c$. The IF signal at each receiving antenna is then frequency corrected by frequency shifting based on the corresponding estimated frequency offset.

A second method (correlation method) for estimating the frequency offset, which does not involve identifying dominant peaks, is to compare the reference frequency spectrum amplitude with different frequency shifted versions of the frequency spectrum corresponding to each receive antenna. The frequency offset is estimated by choosing the frequency shift that produces the closest match to the reference frequency spectrum, that is, the frequency shift which correlates the best to the reference frequency spectrum. Each frequency shift in each of the frequency shifted versions is an integral multiple of $ST_c$. The range of the integral multiples that are tried out is based on prior knowledge of this range based on system design and, for instance, can be the range ($ST_c$, 0, $-ST_c$). Thus for example in graph 1002, if spectrum 1010 represents the frequency spectrum of the IF signal at chip 902 of FIG. 9, and spectrum 1012 represents the frequency spectrum of the IF signal at chip 904, the best correlation of the two tones would occur if tone 1012 was shifted back a distance of $\Delta f$. Thus, the method described would estimate the frequency offset $\Delta f$.

In the design of standard radar chips, placement of antennas on the package of a radar chip without taking into account tiling considerations can sometimes result in very large gaps which can be difficult to fill by virtual antennas. The placement of the RX antennas results in a large inter-chip gap which may be difficult to fill using synthesized virtual antennas.

Figure 11:
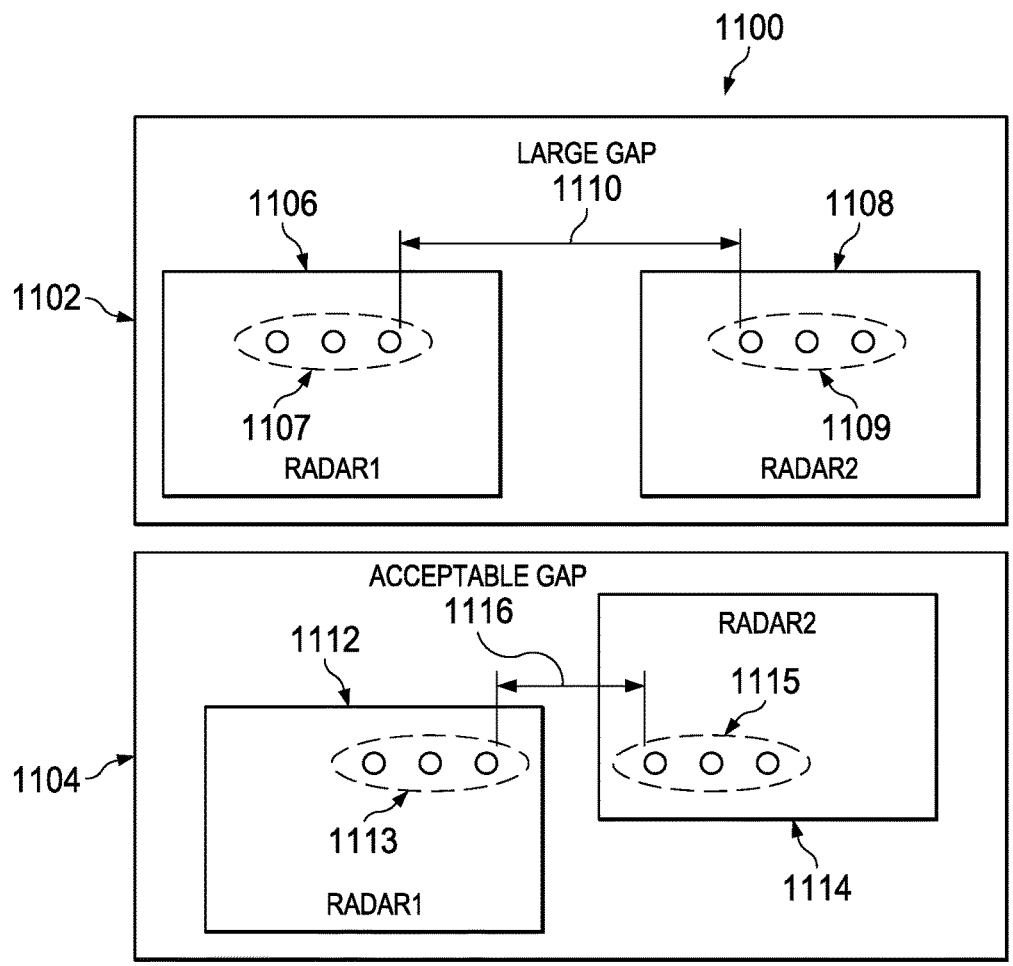
FIG. 11 shows a diagram illustrating the placement of antennas on radar chips in accordance with aspects of the present invention.

FIG. 11 shows diagram 1100 illustrating the placement of antennas on radar chips.

As shown in the figure, diagram 1100 includes a placement example 1102 and a placement example 1104. Placement example 1102 includes a radar chip 1106, a radar chip 1108 and a distance line 1110. Placement example 1104 includes a radar chip 1112, a radar chip 1114 and a distance line 1116. Radar chip 1106 includes an antenna array 1107. Radar chip 1108 includes an antenna array 1109. Radar chip 1112 includes an antenna array 1113. Radar chip 1114 includes an antenna array 1115.

Antenna array 1107 is arranged in the center of radar chip 1106. Similarly, antenna array 1109 is arranged in the center of radar chip 1108. Radar chip 1106 and radar chip 1108 are arranged to be as physically close as possible. Antenna array 1113 is arranged close to one side of radar chip 1112. Similarly, antenna array 1115 is arranged close to one side of radar chip 1114.

Placement 1102 represents an antenna placement which has not had tiling taken into account. As shown in the figure, for placement 1102, even with the chips placed as close as possible the distance between antenna arrays as illustrated by distance line 1110 is much larger than the distance between antennas within the arrays and as such is unacceptably large. Placement 1104 represents an antenna placement in accordance with aspects of the present invention in which tiling has been considered. As shown in the figure, for placement 1104, the distance between antenna arrays is on the order of that between the antennas and so is acceptable. This is achieved by placing the antenna array very close to one edge of the radar chip and by orienting the radar chips with respect to each other such that a long antenna array is formed from the antenna arrays of both chips. It should be noted that radar chip 1112 and 1114 may refer to two instances of the same ("standard") chip, with radar chip 1114 being rotated with respect to chip 1112.

So far, one-dimensional tiling of radar chips has been discussed. One-dimensional tiling helps in improving the angular resolution along a single angular dimension, such as azimuth. However, two-dimensional tiling of multiple radar chips can improve angular resolution in both azimuth and elevation.

Figure 12:
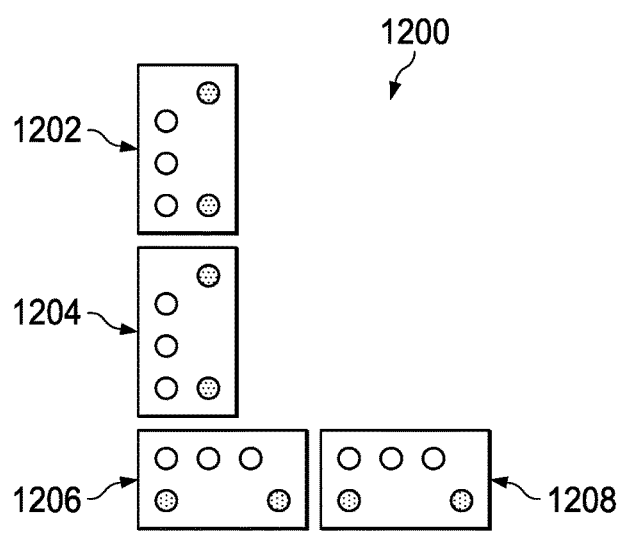
FIG. 12 illustrates two-dimensional tiling of radar chip in accordance with aspects of the present invention.

FIG. 12 shows diagram 1200 which illustrates two-dimensional tiling of radar chips.

As shown in the figure, diagram 1200 includes radar chip 1202, radar chip 1204, radar chip 1206 and radar chip 1208.

Radar chip 1202 and radar chip 1204 are arranged in a vertical tile configuration. Radar chip 1206 and radar chip 1208 are arranged perpendicularly to radar chip 1202 and radar chip 1204.

Being perpendicular to each other, radar chip 1206 and radar chip 1208 can be used to resolve angles in azimuth. Radar chip 1202 and radar chip 1204 are used to resolve angles in elevation.

Systems in accordance with aspects of the present invention have been described to this point using high level diagrams and illustrations. These systems are now discussed in more detail.

Figure 13:
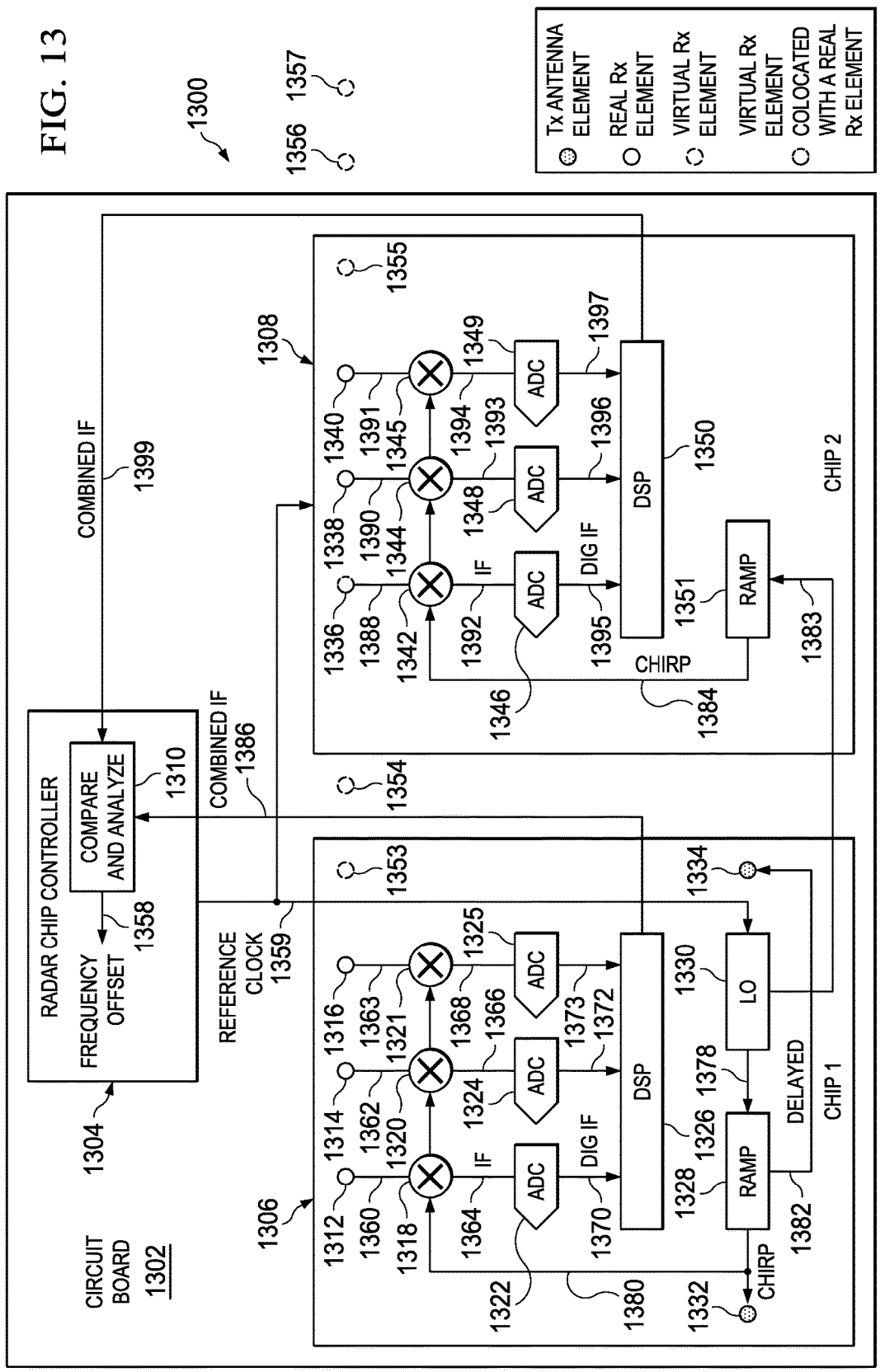
FIG. 13 shows a block diagram illustrating in greater detail an embodiment of the present invention in which the local oscillator signal generated in one chip is routed to all the chips in accordance with aspects of the present invention.

FIG. 13 shows block diagram 1300 illustrating in more detail an embodiment of the present invention in which the local oscillator signal generated in one chip is routed to all the chips.

As shown in the figure, block diagram 1300 includes a circuit board 1302, a chip controller 1304, a radar chip 1306, a radar chip 1308, a virtual receive antenna 1353, a virtual receive antenna 1354, a virtual receive antenna 1355, a virtual receive antenna 1356 and a virtual receive antenna 1357.

Additionally, chip controller 1304 includes a compare and analyze component 1310.

Additionally, radar chip 1306 includes a receive antenna 1312, a receive antenna 1314, a receive antenna 1316, a mixer 1318, a mixer 1320, a mixer 1321, an ADC 1322, an ADC 1324, an ADC 1325, a DSP 1326, a ramp generator 1328, an LO 1330, a transmit antenna 1332, and a transmit antenna 1334.

Additionally, radar chip 1308 includes a receive antenna 1336, a receive antenna 1338, a receive antenna 1340, a mixer 1342, a mixer 1344, a mixer 1345, an ADC 1346, an ADC 1348, an ADC 1349, a DSP 1350 and a ramp generator 1351.

Receive antenna 1312 is arranged to connect to mixer 1318 via a line 1360. It should be noted that, intermediate circuitry may be included to modify signals along line 1360. Receive antenna 1314 is arranged to connect to mixer 1320 via a line 1362. It should be noted that, intermediate circuitry may be included to modify signals along line 1362. Receive antenna 1316 is arranged to connect to mixer 1321 via a line 1363. It should be noted that, intermediate circuitry may be included to modify signals along line 1363.

Mixer 1318 connects to ADC 1322 via a line 1364, mixer 1320 to ADC 1324 via a line 1366 and mixer 1321 to ADC 1325 via a line 1368. It should be noted that, intermediate circuitry may be included to modify signals along lines 1364, 1366 and/or 1368. DSP 1326 is arranged to connect to ADC 1322 via a line 1370, to ADC 1324 via a line 1372 and to ADC 1325 via a line 1373. It should be noted that, intermediate circuitry may be included to modify signals along lines 1370, 1372 and/or 1373.

DSP 1326 outputs signals to chip controller 1304 via a line 1386. LO 1330 connects to ramp generator 1328 via a line 1378. LO 1330 also connects to ramp generator 1351 of radar chip 1308.

Ramp generator 1328 connects to mixer 1318, mixer 1320 and mixer 1321 via a line 1380. It should be noted that, intermediate circuitry may be included to modify signals along line 1380. Line 1380 is also arranged to connect ramp generator 1328 with transmit antenna 1332. It should be noted that, intermediate circuitry may be included to modify signals along line 1332. Transmit antenna 1334 connects to ramp generator 1328 via a line 1382. It should be noted that, intermediate circuitry may be included to modify signals along line 1382.

Receive antenna 1336 is arranged to connect to mixer 1342 via a line 1388. It should be noted that, intermediate circuitry may be included to modify signals along line 1388. Receive antenna 1338 is arranged to connect to mixer 1344 via a line 1390. It should be noted that, intermediate circuitry may be included to modify signals along line 1390. Receive antenna 1340 is arranged to connect to mixer 1345 via a line 1391. It should be noted that, intermediate circuitry may be included to modify signals along line 1391. Mixer 1342 connects to ADC 1346 via a line 1392, mixer 1344 to ADC 1348 via a line 1393 and mixer 1345 to ADC 1349 via a line 1394. It should be noted that, intermediate circuitry may be included to modify signals along lines 1392, 1393 and 1394.

DSP 1350 is arranged to connect to ADC 1346 via a line 1395, to ADC 1348 via a line 1396 and to ADC 1349 via a line 1397. It should be noted that, intermediate circuitry may be included to modify signals along line 1395, 1396 and/or 1397. DSP 1350 outputs signals to chip controller 1304 via a line 1399. It should be noted that, intermediate circuitry may be included to modify signals along lines 1399.

LO 1330 connects to ramp generator 1351 via a line 1383. It should be noted that, intermediate circuitry may be included to modify signals along line 1378. Mixer 1342, mixer 1344 and mixer 1345 connect to ramp generator 1351 of chip 2 via a line 1384. It should be noted that, intermediate circuitry may be included to modify signals along line 1384.

Chip controller 1304 is operable to control radar chips and provide processing functions for a plurality of radar chips. Radar chip 1306 and radar chip 1308 are both operable to provide transmit, receive radar functions and timing functions.

Receive antennas 1312, 1314, 1316, 1336, 1338, and 1340 are each operable to receive radar signals over the air. Mixers 1318, 1320, 1321, 1342, 1344, and 1345 each provide a frequency mixing function. ADCs 1322, 1324, 1325, 1346, 1348 and 1349 each provide analog signal to digital signal conversion.

LO 1330 is operable to function as a local oscillator and provide ramp signals to ramp generators 1328 and 1351. Ramp generator 1328 and ramp generator 1351 are operable to provide frequency ramps (i.e. chirps). Compare and analyze component 1310 is operable to compare and analyze received signals and to compute frequency offsets and/or phase offsets.

In operation, ramp generator 1328 generates frequency ramps (chirps) to transmit antennas 1332 and 1334 according to signals supplied by LO 1330. Transmit antennas 1332 and 1334 transmit the chirps over the air. For radar chip 1306, receive antennas 1312, 1314 and 1316 form a real receive antenna array to receive radar returns over the air. The signals from the receive antenna array are mixed with the transmitted chirps, referred to as "mixing chirps" for this function, at mixers 1318, 1320 and 1321 to form analog IF signals at the mixer outputs. The signals are digitally sampled by ADCs 1322, 1324 and 1325 to produce digital IF signals which are passed on to DSP 1326 for processing.

Since this embodiment contains a plurality of radar chips, receive signal data is initially processed by DSP 1326 and then passed to radar chip controller 1304 for further processing inclusive of receive signal data from other radar chips. Radar chip 1308 operates in a similar manner to radar chip 1306. For radar chip 1306, receive antennas 1336, 1338 and 1340 form another real receive antenna array and the received signals from the array are mixed with the transmitted chirps at mixers 1342, 1344 and 1345.

In this embodiment, the mixing chirp for radar chip 1308 is derived from the LO signal of radar chip 1306. So, LO 1330 of radar chip 1306 provides the signal to ramp generator 1351 of radar chip 1308 via line 1383. Ramp generator 1351 of radar chip 1308 then provides the chirp signal for the mixers of radar chip 1308 via line 1384. For radar chip 1308, ADCs 1346, 1348 and 1349 provide digital sampling and the digital IF signals are passed on to DSP 1350 for initial processing and to chip controller 1304 for further processing inclusive of receive signal data from radar chip 1306. Within chip controller 1304, compare and analyze component 1310 processes signals from both chips to estimate any frequency offsets and/or phase offsets present between radar chips.

In this embodiment, two virtual receive antenna arrays are generated by digital signal processing. One such array is comprised of virtual receive antenna 1353, virtual receive antenna 1354 and an overlap with receive antenna 1336, which is part of a real antenna array. The other virtual receive antenna array is comprised of virtual receive antenna 1355, virtual receive antenna 1356 and virtual receive antenna 1357.

This embodiment can support one or more of the phase and frequency offset calibration techniques described earlier in this specification including the single co-located antenna method for phase offset calibration, the dominant peak method for frequency offset calibration and the correlation method for frequency offset calibration. Overlapping real and virtual antennas are present for phase offsets between radar chip 1306 and radar chip 1308. Chip controller 1304 which contains compare and analyze component 1310 can support either the dominant peak method or the correlation method for determining frequency offsets.

In this example, compare and analyze component 1310 is illustrated as a unitary element. However, in some embodiments, compare and analyze component 1310 may be two separate components—one component that can estimate a misalignment between radar chip 1306 and second radar chip 1308 based on the combined IF received signals, and one component that can estimate a frequency offset between the frequency spectrum signals.

FIG. 13 depicts a system in accordance with the present invention in which the local oscillator of one radar chip is used to derive the chirps for all the radar chips. In another embodiment, the radar chip controller component generates a reference clock which is distributed to all radar chips. Chirps for all the radar chips are derived from this common reference clock. This can be illustrated with a block diagram which is modification to FIG. 13.

Figure 14:
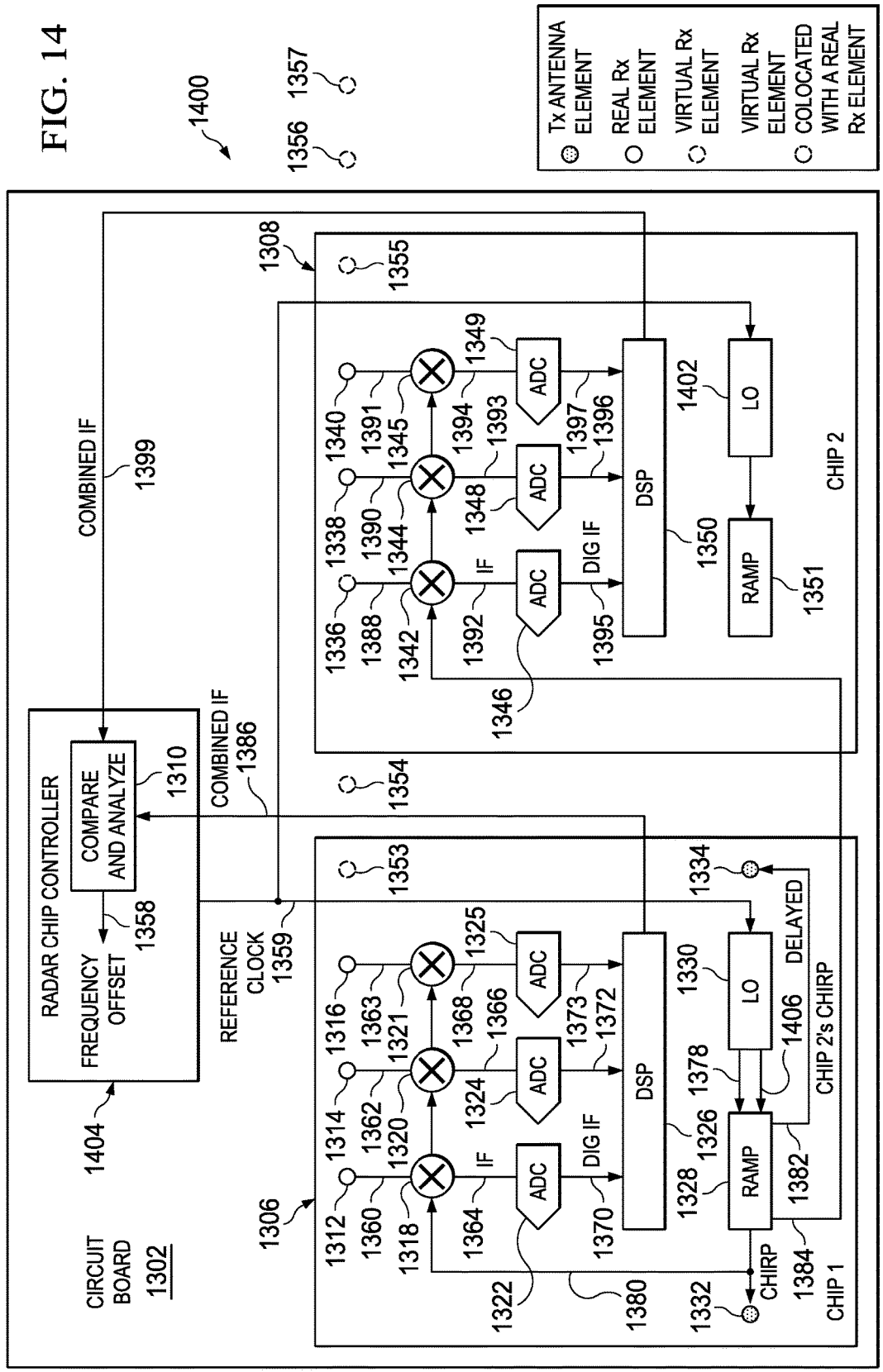
FIG. 14 shows a block diagram illustrating an embodiment of the present invention in which each chip generates its own LO signal, and hence its own chirp, using the common reference clock in accordance with aspects of the present invention.

FIG. 14 shows block diagram 1400, illustrating an embodiment of the present invention in which each chip generates its own LO signal, and hence its chirp, using the common reference clock.

As shown in the figure, block diagram 1400 is essentially that of FIG. 13 except that signals from the LO of chip 1 is no longer routed to chip 2. Instead each chip generates its own LO signals based on the common reference clock. In the interests of brevity, descriptions of components, arrangements, operability and operation will not be repeated where these are identical to those described for FIG. 13. However, differences between the systems will be described with reference to both systems.

For FIG. 14, the reference clock, passed via line 1359 to local oscillators of both radar chips, i.e. LO 1330 and LO 1402. So, instead of having a single LO signal generated from one chip and routed to all the other chips as shown in FIG. 13, LO 1330 and LO 1402 use the common reference clock to derive their own frequencies and timing. Thus, in this embodiment, chirps for all radar chips, i.e. both radar chip 1306 and radar chip 1308, are derived from a common reference clock as generated by a common radar chip controller.

Tiled radar chip configurations described so far have employed only two transmit antennas on one of the radar chips. It is also possible to increase the effective array length by employing the transmit antennas on more than one radar chip in the configuration. This is achieved since radar returns from the additional transmitters can be used to generate additional virtual antennas. This is concept is discussed below.

Figure 15:
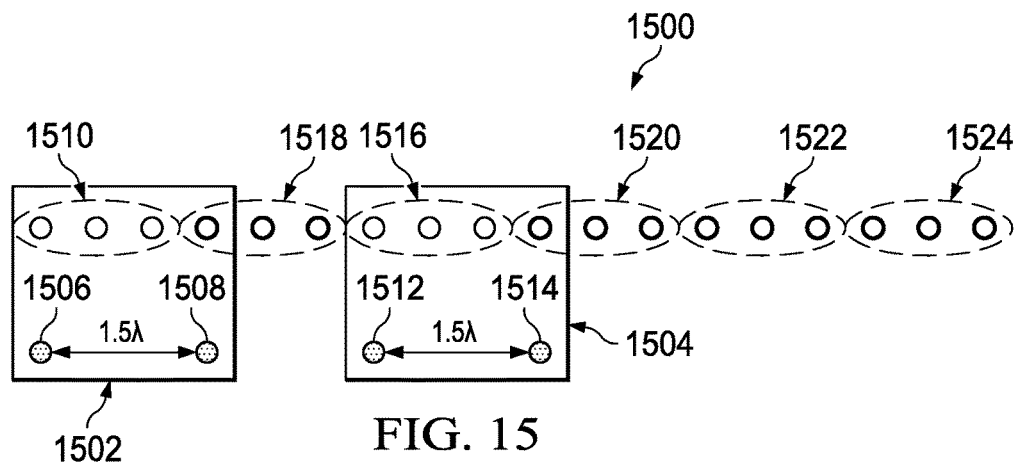
FIG. 15 illustrates a tiled radar chip configuration with radar returns from the additional transmitters used to generate additional virtual antennas.

FIG. 15 shows diagram 1500 which illustrates a tiled radar chip configuration with radar returns from the additional transmitters used to generate additional virtual antennas.

As shown in the figure, diagram 1500 includes a radar chip 1502, a radar chip 1504, a virtual antenna array 1518, a virtual antenna array 1520, a virtual antenna array 1522 and a virtual antenna array 1524. Radar chip 1502 includes a transmit antenna 1506, a transmit antenna 1508 and a receive antenna array 1510. Radar chip 1504 includes a transmit antenna 1512, a transmit antenna 1514 and a receive array 1516.

Radar chip 1502 and radar chip 1504 are arranged in a tile configuration. Transmit antenna 1506 and transmit antenna 1508 are arranged to be 1.5λ distance apart. Transmit antenna 1512 and transmit antenna 1514 are arranged to be 1.5λ distance apart.

Additionally, radar chip 1502 and radar chip 1504 are operable to provide reception of radar signals and signal processing of received radar signals. Transmit antenna 1506, transmit antenna 1508, transmit antenna 1512 and transmit antenna 1514 are operable to transmit a radar chirp. Receive antenna array 1510 and receive antenna array 1516 are operable to receive return signals over the air.

In operation, transmit antenna 1506, transmit antenna 1508, transmit antenna 1512 and transmit antenna 1514 transmit chirps over the air. Returns from the chirps are received at the real antenna arrays, receive antenna array 1510 and receive antenna array 1516. As described in previous sections of this specification, virtual arrays are generated from the received return signals from all four transmit antennas.

In this embodiment, virtual antenna arrays 1518, 1520, 1522 and 1524 are generated. This embodiment, therefore, yields a total synthesized receive array of length 18.

Sometimes, placement restrictions within the package, or restrictions on the package dimensions, might limit the flexibility available for antenna placement. For example, transmit antennas may be placed λ apart rather than the desired 1.5λ as shown in FIG. 15. There can also be restrictions on the minimum distance between adjacent chips. Nevertheless, even with these restrictions it is often possible to synthesize a near contiguous receive antenna array using less than ideal antenna and chip spacing. Such an embodiment is described below.

Figure 16:
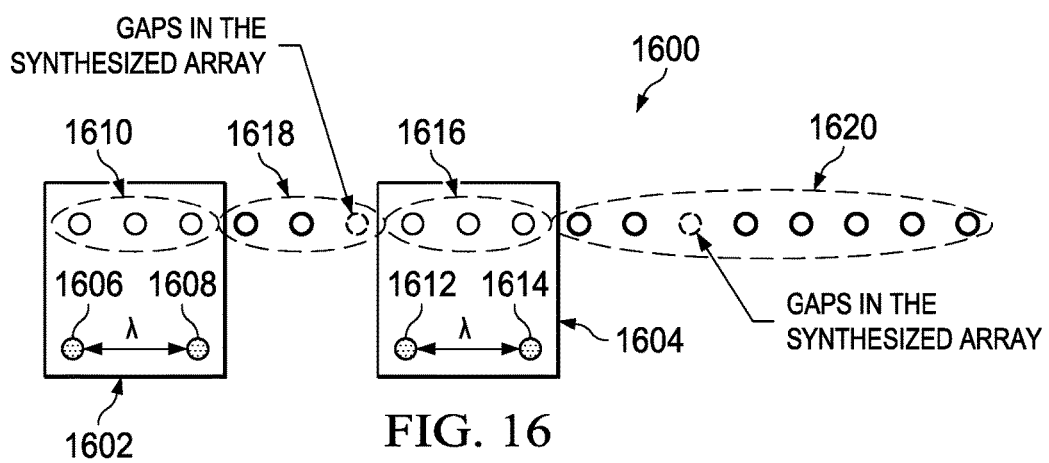
FIG. 16 illustrates a tiled radar configuration with transmit antenna placement restrictions.

FIG. 16 shows diagram 1600 which illustrates a tiled radar configuration with transmit antenna placement restrictions.

As shown in the figure, diagram 1600 includes a radar chip 1602, a radar chip 1604, a virtual antenna array 1618 and a virtual antenna array 1620. Radar chip 1602 includes a transmit antenna 1606, a transmit antenna 1608 and a receive antenna array 1610. Radar chip 1604 includes a transmit antenna 1612, a transmit antenna 1614 and a receive antenna array 1616.

Radar chip 1602 and radar chip 1604 are arranged in a tiled configuration. Transmit antenna 1606 and transmit antenna 1608 are arranged to be λ distance apart. Transmit antenna 1612 and transmit antenna 1614 are arranged to be λ distance apart.

Radar chip 1602 and radar chip 1604 are operable to provide reception of radar signals and signal processing of received radar signals. Transmit antenna 1606, transmit antenna 1608, transmit antenna 1612 and transmit antenna 1614 are operable to transmit a radar chirp. Receive antenna array 1610 and receive antenna array 1616 are operable to receive return signals over the air.

In operation this configuration, as in configuration 1500 of FIG. 15, virtual arrays are generated from the received return signals from all four transmit antennas. In this configuration however, since transmit antennas of both chips are λ distance apart rather than the preferred 1.5λ distance apart, virtual arrays with missing elements, i.e. gaps in the synthesized array are generated, as illustrated by virtual antenna array 1618 and virtual antenna array 1620.

Nevertheless, virtual arrays are indeed generated. For this configuration a total synthesized array of length 15 with two gaps is produced. The increase in flexibility in transmit antenna placement results in a performance degradation due to virtual array gaps as compared to ideal spacing cases, but often the performance is still acceptable or can be mitigated using filtering methods.

It has been explained how antenna array synthesis using sparse antenna techniques has been uniquely applied to tiled configurations of standard radar chips in order to overcome significant problems in producing cost-effective radar systems which support arrival angle resolutions necessary for many of today's emerging applications, such as gesture recognition radar and automotive radar. It has been shown that such novel aspects of the present invention can eliminate the need for costly and space-consuming external antenna implementations and can also overcome the restrictions on chip size, antenna spacing and chip spacing inherent in conventional multi-chip techniques which have conventionally required extensive chip customization.

Various novel embodiments have been described which facilitate the application of the present invention in terms of clock distribution, calibration and synchronization of phase and of frequency.

Other novel embodiments have been introduced and explained which extend the flexibility of the present invention even further. These include standard chip antenna layouts which can significantly reduce the need for chip customization, tile layouts which support radar operation in one and two dimensions (elevation, azimuth and both) and embodiments which introduce performance versus dimensional flexibility tradeoffs.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
    a circuit board operable to receive electronic devices;
    a first radar chip disposed on said circuit board, said first radar chip comprising a first radar transmission antenna, a second radar transmission antenna and a first radar receiver antenna array, said first radar transmission antenna being operable to transmit a first radar transmission signal, said second radar transmission antenna being operable to transmit a second radar transmission signal;
    a second radar chip disposed on said circuit board, said second radar chip comprising a second radar receiver antenna array, said second radar chip being spaced from said first radar chip so as to create a virtual receiver antenna array between said first radar receiver antenna array and said second radar receiver antenna array; and
    a controlling component disposed on said circuit board, said controlling component being operable to control said first radar chip and said second radar chip.

2. The device claim 1,
    wherein said first radar receiver antenna array comprises a first radar receiver antenna, and
    wherein said first radar transmission antenna is spaced from said second radar transmission antenna so as to create a first virtual receiver antenna collocated with said first radar receiver antenna.

3. The device of claim 2,
    wherein said first radar receiver antenna is operable to generate a first radar received signal, wherein said first radar chip is operable to generate a first virtual received signal based on the second radar transmission signal and associated with said first virtual receiver antenna, and wherein said first radar chip is operable to perform a calibration procedure based on the first virtual received signal and the first radar received signal.

4. The device claim 1, wherein said second radar receiver antenna array comprises a second radar receiver antenna, and wherein said second radar chip is spaced from said first radar chip so as to create a second virtual receiver antenna collocated with said second radar receiver antenna.

5. The device claim 4, wherein said second radar receiver antenna is operable to generate a second radar received signal, wherein said first radar chip is further operable to generate a second virtual received signal based on the second radar transmission signal and associated with said second virtual receiver antenna, and wherein said controller component is still further operable to perform a calibration procedure based on the second virtual received signal and the second received radar signal.

6. The device claim 1, wherein said first radar chip includes a first side and a second side, wherein said first radar receiver antenna array is asymmetrically disposed so as to be closer to said first side than said second side, wherein said second radar chip includes a third side and a fourth side, wherein said second radar receiver antenna array is asymmetrically disposed so as to be closer to said third side than said fourth side, and wherein said first side is closer to said third side than said fourth side.

7. The device of claim 1, wherein said first radar chip further comprises a first ramp generator operable to generate a first frequency ramp signal, wherein said second radar chip further comprises a second ramp generator operable to generate a second frequency ramp signal, wherein each antenna in said first radar receiver antenna array comprises an associated mixer, respectively, wherein each antenna in said first radar receiver antenna array is operable to receive a respective receive signal, each respective receive signal corresponding to the first radar transmission signal, wherein each antenna in said first radar receiver antenna array is further operable to mix the respective receive signal with the first frequency ramp signal to generate a corresponding IF received signal, respectively, wherein said first radar chip is operable to generate a first combined IF received signal from a plurality of the IF received signals, wherein each antenna in said second radar receiver antenna array comprises an associated second array mixer, respectively, wherein each antenna in said second radar receiver antenna array is operable to receive a respective second array receive signal, each respective second array receive signal corresponding to the first radar transmission signal, wherein each antenna in said second radar receiver antenna array is further operable to mix the respective second array receive signal with the second frequency ramp signal to generate a corresponding second array IF received signal, respectively, and wherein said second radar chip is further operable to generate a second combined IF received signal from one of the second array IF received signals.

8. The device of claim 7, wherein said second ramp generator is operable to generate the second frequency ramp signal based on a signal received from a first local oscillator.

9. The device claim 8, wherein said controlling component further includes a comparing component operable to estimate a misalignment between said first radar chip and said second radar chip based on the first combined IF received signal and the second combined IF received signal, and wherein said comparing component includes a frequency analyzing component operable to generate a first frequency spectrum signal based on the first combined IF received signal, to generate a second frequency spectrum signal based on the second IF received signal, and to estimate a frequency offset between the first frequency spectrum signal and the second frequency spectrum signal.

10. The device claim 7, wherein said controlling component is further operable to provide a reference clock to said first radar chip and to said second radar chip, wherein said first ramp generator is operable to generate the first frequency ramp signal based on the reference clock, and wherein said second ramp generator is further operable to generate the second frequency ramp signal based on the reference clock.

11. The device claim 10, wherein said controlling component further comprises a comparing component operable to estimate a misalignment between said first radar chip and said second radar chip based on the IF received signal and the second array IF received signal, and wherein said comparing component comprises a frequency analyzing component operable to generate a first frequency spectrum signal based on the IF received signal, to generate a second frequency spectrum signal based on the second array IF received signal, and to estimate a frequency offset between the first frequency spectrum signal and the second frequency spectrum signal.

12. A method comprising:

controlling, via a controlling component disposed on a circuit board, a first radar chip disposed on the circuit board, the first radar chip comprising a first radar transmission antenna, a second radar transmission antenna and a first radar receiver antenna array;

controlling, via the controlling component, a second radar chip disposed on the circuit board, the second radar chip comprising a second radar receiver antenna array;

transmitting, via the first radar transmission antenna, a first radar transmission signal;

transmitting, via the second radar transmission antenna, a second radar transmission signal, wherein the second radar chip is spaced from the first radar chip so as to create a virtual receiver antenna array between the first radar receiver antenna array and the second radar receiver antenna array.

13. The method claim 12,
wherein the first radar receiver antenna array comprises a first radar receiver antenna, and
wherein the first radar transmission antenna is spaced from the second radar transmission antenna so as to create a first virtual receiver antenna collocated with the first radar receiver antenna.

14. The method of claim 13, further comprising:
generating, via the first radar receiver antenna, a first radar received signal;
generating, via the first radar chip, a first virtual received signal based on the second radar transmission signal and associated with the first virtual receiver antenna; and
performing, via the first radar chip, a calibration procedure based on the first virtual received signal and the first radar received signal.

15. The method claim 12,
wherein the second radar receiver antenna array comprises a second radar receiver antenna, and
wherein the second radar chip is spaced from the first radar chip so as to create a second virtual receiver antenna collocated with the second radar receiver antenna.

16. The method claim 15, further comprising:
generating, via the second radar receiver antenna, a second radar received signal;
generating, via the first radar chip, a second virtual received signal based on the second radar transmission signal and associated with the second virtual receiver antenna; and
performing, via the controller component, a calibration procedure based on the second virtual received signal and the second received radar signal.

17. The method claim 12,
wherein the first radar chip includes a first side and a second side,
wherein the first radar receiver antenna array is asymmetrically disposed so as to be closer to the first side than the second side,
wherein the second radar chip includes a third side and a fourth side,
wherein the second radar receiver antenna array is asymmetrically disposed so as to be closer to the third side than the fourth side, and
wherein the first side is closer to the third side than the fourth side.

18. The method of claim 12, further comprising:
generating, via a first ramp generator of the first radar chip, a first frequency ramp signal;
generating, via a second ramp generator of the second radar chip, a second frequency ramp signal;
receiving, via each antenna in the first radar receiver antenna array, a respective receive signal, each respective receive signal corresponding to the first radar transmission signal;
mixing, via a mixer of each antenna in the first radar receiver antenna array, the respective receive signal with the first frequency ramp signal to generate a corresponding IF received signal, respectively;
generating, via the first radar chip, a first combined IF received signal from a plurality of the IF received signals;
wherein each antenna in said second radar receiver antenna array comprises an associated second array mixer, respectively;
receiving, via each antenna in the second radar receiver antenna array, a respective second array receive signal, each respective second array receive signal corresponding to the first radar transmission signal;
mixing, via a mixer of each antenna in the second radar receiver antenna array, the respective second array receive signal with the second frequency ramp signal to generate a corresponding second array IF received signal, respectively; and
generating, via the second radar chip, a second combined IF received signal from one of the second array IF received signals.

19. The method of claim 18, wherein said generating the second frequency ramp signal comprises generating the second frequency ramp signal based on a signal received from a first local oscillator.

20. The method claim 19, further comprising:
estimating, via a comparing component of the controlling component, a misalignment between the first radar chip and the second radar chip based on the first combined IF received signal and the second combined IF received signal;
generating, via a frequency analyzing component of the comparing component, a first frequency spectrum signal based on the first combined IF received signal;
generating, via the frequency analyzing component, a second frequency spectrum signal based on the second IF received signal; and
estimating, via the frequency analyzing component, a frequency offset between the first frequency spectrum signal and the second frequency spectrum signal.

* * * * *